Aug. 5, 1941.     C. G. DUFFY, JR     2,251,840
CEILING TILE
Filed Aug. 1, 1940
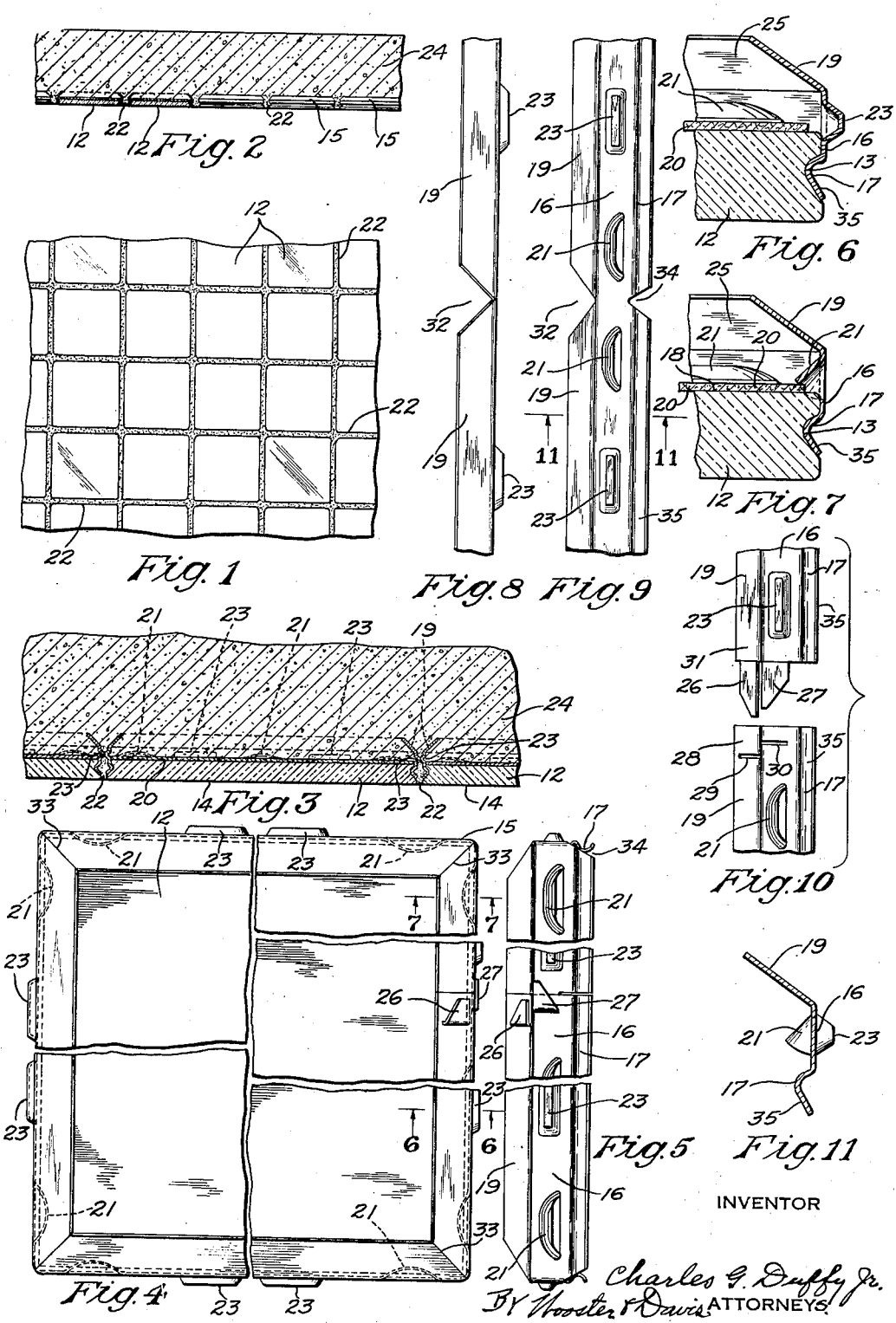
INVENTOR
Charles G. Duffy, Jr.
BY Wooster & Davis
ATTORNEYS Patented Aug. 5, 1941

2,251,840

UNITED STATES PATENT OFFICE 2,251,840

CEILING TILE

Charles G. Duffy, Jr., Darien, Conn.

Application August 1, 1940, Serial No. 349,055

10 Claims. (Cl. 72—19)

This invention relates to a tile and ceiling construction designed primarily for the ceilings or inner linings or vehicular tunnels, although of course it is not limited to such use, but may be used for ceilings or side walls in buildings or other structures.

It has for an object to provide a structure having a permanent finished surface, an absolute mechanical bond, light reflecting qualities, a replaceable feature should the tile be damaged, and can be easily cleaned.

It is also an object to provide a tile construction which comprises a minimum number of parts, and which may be manufactured and assembled in quantity production.

With the foregoing and other objects in view I have devised a tile assembly and bonding structure therefor illustrated in the accompanying drawing forming a part of this specification. It will, however, be understood I am not limited to the details shown, but may employ various changes and modifications within the scope of the invention.

In this drawing:

Fig. 1 is a face view of a portion of the ceiling or lining after it has been installed;

Fig. 2 is a section thereof;

Fig. 3 is a longitudinal section on a larger scale showing the tiles in place;

Fig. 4 is a top plan view of the tile assembly;

Fig. 5 is a side elevation thereof looking from the right of Fig. 4;

Fig. 6 is a detail section on an enlarged scale taken substantially on line 6—6 of Fig. 4;

Fig. 7 is a similar section taken substantially on line 7—7 of Fig. 4;

Fig. 8 is a top plan view of a portion of the bonding structure used for mounting the tile;

Fig. 9 is a side view thereof looking from the right of Fig. 8;

Fig. 10 is a view of the end portions of the supporting and bonding structure showing the ends separated and means for fastening them together before being placed in the fastening position; and Fig. 11 is a detailed section substantially on line 11—11 of Fig. 9.

This improved tile assembly, shown in its entirety in Figs. 4 and 5, comprises a tile 12 of glass or similar vitreous or ceramic material, although it is not confined to glass but may be of other plastics or similar materials. Glass is ordinarily used because of its relatively low cost, its attractive appearance, its surface may be readily cleaned, and provides a permanent durable finish, but it is to be understood that where the term glass is employed throughout the specification and claims it is used in a generic sense to include other vitreous and plastic materials which may be suitable. This tile is preferably of square or rectangular shape and has in its side edges a groove 13 extending longitudinally thereof. It is preferred that this groove extend throughout the periphery of the tile, but it may be found in some instances that providing the groove in two opposite sides only is sufficient. One surface 14 of the tile is exposed at the surface of the ceiling or wall and may be a plain surface or may be roughened or decorated as desired.

Each tile 12 is mounted in a bonding frame or support 15 which comprises a strip of sheet metal, preferably of copper or copper alloy, but of course may be of any suitable metal. This strip may be rolled to the proper shape in cross section of any desired length and then cut off to the proper length and formed to the shape to embrace the tile 12. The cross section preferred is shown in Figs. 6, 7 and 11, and comprises a straight side wall 16 to seat against the edge of the tile 12, and at one edge of this side wall is provided with an inwardly extending rib or crimp 17 to seat in the groove 13 in the edges of the tile 12. The straight side wall 16 preferably extends beyond the rear or inner surface 18 of the tile 12 and then its inner or rear edge portion is inclined laterally to form overhanging walls 19. The frame or support is preferably so formed that these inclined walls 19 project inwardly over the tile 12 and form a space to receive concrete or other plastic material forming a part of the wall or ceiling, which after it hardens coacts with these inclined walls to bond the tile to the wall or ceiling construction.

There is preferably provided at the rear or inner surface 18 of the tile 12 a filler 20 which is preferably a fibrous sheet of suitable material such for example as heavy tar paper or other suitable material, to separate the tile 12 from the concrete or plastic material. It is preferably of waterproof material. This filler may or may not be used as found desirable. It is held in place by lugs 21 formed by cutting the side walls 16 and forcing a portion at the upper side of the cut inwardly over the filler to form this lug 21.

It is also desirable that when the tiles are laid the side edges of adjacent tiles be spaced somewhat from each other and that the spaces be filled with grout, cement or other suitable material as indicated at 22. In assembling the tiles they are arranged side by side on a suitable support face down. To facilitate proper relative spacing of the tiles and to maintain them in the proper spaced relation, bumps or lugs 23 are pressed outwardly from the wall 16. Any suitable number of these lugs or bumps may be provided, but preferably there are two on each side of the tile spaced a short distance from the corners. Two on each edge is preferred and found sufficient. These lugs of the adjacent tile engage each other as shown in Fig. 3 and hold the tile in proper spaced relation. Then the grout or other suitable joint material is poured into or applied by trowel, or other suitable means to the narrow space between the edges of the tile to properly fill this space. After this material has hardened the reenforcing mesh is set in place and the concrete backing forming a structural part of the ceiling is poured into position and allowed to set and harden. This material flows into the space 25 at the rear surface of the tile 12 formed by the overhanging inclined walls 19, and it will be seen that when this concrete or similar material hardens the tiles are securely bonded to this concrete or other material and will be held in place thereby. The supporting forms may then be removed leaving the finished ceiling exposed.

Various means may be employed to secure together the ends of the metal strip forming the frame or support 15. A simple and satisfactory means is shown in Fig. 10, in which one end portion is provided with one or more outwardly extending lugs 26 and 27 offset inwardly from the walls of the strip so that they may be located at the inner side of the opposite end portion 28 and extended through slots 29 and 30 respectively in this end portion. They are then folded over on to the outer side of the strip, as shown in Figs. 4 and 5, the offsetting of the lugs 26 and 27 inwardly from the plane of the walls of the strip bringing the end portions 28 and 31 into the same plane so that their free ends abut.

To facilitate forming the strip into the rectangular or square shape to form the frame 15 substantially V-shaped miter notches 32 are cut in the inclined wall 19 at the point where the bend would occur for a corner of the frame, so that when the strip is formed into the frame the edges of this notch come together as shown at 33, Fig. 4. Similarly a miter notch 34 is cut on the opposite side of the strip through the crimp 17 so that the edges of the notch come together after folding. This also allows the free edge portion 35 of the crimp to spring outwardly to more readily slide over the edge of the tile 12 and spring into the groove 13 in the edges of this tile to snugly seat therein to retain the tile in the frame. In other words in assembling this tile the frame is formed by bending at the points between the notches 32 and 34, and the free ends connected by the lugs 26 and 27 being inserted in the slots 29 and 30 and folded over as previously described. Then the tile 12 with the frame resting on the back thereof is placed in a suitable press which exerts pressure to press the two together, causing the crimped portions 17 to slide over the edges of the tile and snap into and snugly seat into the grooves 13.

It will be seen this makes a very simple and practical construction which lends itself to forming and assembling in quantity production, and when assembled the tile is effectively mounted in the frame. When mounted in the ceiling or wall the tile is very effectively bonded to the supporting structure.

Having thus set forth the nature of my invention, what I claim is:

1. A ceiling construction comprising a series of tile assemblies each including a tile having a longitudinally extending groove in each of a plurality of its side edges, a metal support for each tile comprising a metal strip extending about the periphery of the tile including crimps adjacent one edge seated in said grooves and comprising portions adjacent the other edge extending beyond the back surface of the tile and inclined inwardly thereover to form overhanging walls, and concrete at the rear of the tiles cooperating with the inclined wall portions for bonding purposes.

2. A ceiling construction comprising a layer of hardened plastic material, a series of tile assemblies covering the face of said material each comprising a tile having a longitudinally extending groove in each of a plurality of its side edges, a support for each tile comprising a strip of metal embracing the tile about its edges and comprising crimps adjacent one edge seated in said grooves, said tiles forming the face of the ceiling, and said supporting strip also comprising portions extending rearwardly beyond the tile and inclined to form overhanging walls embedded in the plastic material to bond the tiles thereto.

3. A ceiling construction comprising a layer of hardened plastic material, a series of tile assemblies covering the face of said material each comprising a tile having a longitudinally extending groove in each of a plurality of its side edges, a support for each tile comprising a strip of metal embracing the tile about its edges and comprising ribs adjacent one edge seated in said grooves, said tiles forming the face of the ceiling, the walls of the support including means for bonding the tiles to the plastic backing material, outwardly extending lugs on the strip at the edges of the tile to retain the adjacent tiles in spaced relation, and joint material filling the space between adjacent tiles.

4. A tile assembly of the character described comprising a tile having longitudinally extending grooves in its side edges, a supporting frame comprising a one-piece continuous narrow strip of metal extending along and embracing the side edges of the tile, said strip being formed to provide inwardly extending crimps seated in said grooves, and said strip also comprising means for bonding the tile to a concrete backing.

5. A tile assembly of the character described comprising a tile, a supporting frame comprising a one-piece continuous narrow strip of metal embracing the side edges of the tile, means formed integral with the strip and means formed integral with the tile cooperating to secure the tile in the frame, said strip also comprising means for bonding the tile to a backing of concrete, and integral lugs extending outwardly from the portion of the frame embracing the tile to engage an adjacent tile assembly to retain them in spaced relation.

6. A tile assembly of the character described comprising a tile, a frame for supporting the tile comprising a one-piece continuous narrow strip of metal formed to embrace the side edges of the tile, interlocking means on the adjacent ends of the strip securing them together, cooperating means on the tile and frame securing the tile in the frame comprising longitudinal grooves in the edges of the tile and beads formed in the strip seated in said grooves, and said strip also comprising integral means to bond the tile to a concrete backing.

7. A tile assembly of the character described comprising a tile having a groove in each of a plurality of its side edges, a frame for supporting the tile comprising a narrow strip of metal formed to embrace the side edges of the tile and including inwardly extending ribs seated in said grooves to retain the tile in the frame, interlocking means on the adjacent ends of the strip securing them together, and said strip comprising rear wall portions inclined inwardly over the rear face of the tile to form mechanical bonding means to secure the tile assembly to a backing of concrete.

8. A tile assembly of the character described comprising a tile having a groove in each of a plurality of its side edges, a frame for supporting the tile comprising a narrow strip of metal formed to provide side walls embracing the side edges of the tile and including inwardly extending crimps seated in said grooves to retain the tile in the frame, said strip comprising rear wall portions inclined inwardly over the back of the tile to form means for bonding the tile assembly to a backing of concrete, a filler sheet on the rear face of the tile, and integral lugs cut and forced inwardly from the side walls of the frame and overlying the filler to retain it in position.

9. A tile assembly of the character described comprising a tile, a frame for supporting the tile comprising a narrow strip of metal formed to provide side walls embracing the side edges of the tile, cooperating means on the tile and frame securing the tile in the frame, said strip including means to bond the tile to a concrete backing, a filler sheet on the back surface of the tile, and integral lugs cut and forced inwardly from the side walls of the frame over the filler to retain it against the tile.

10. A tile assembly of the character described comprising a tile having a groove in each of a plurality of its side edges, a frame for supporting the tile comprising a narrow strip of metal formed to embrace the side edges of the tile and including inwardly extending crimps seated in said grooves to retain the tile in the frame, the strip comprising rear portions inclined inwardly over the back of the tile, the said inclined portions and the outer portion of the crimp being notched at the corner bends of the frame to permit bending of the frame without buckling these portions, and interlocking means on the adjacent ends of the strip to secure them together.

CHARLES G. DUFFY, Jr.